(12) United States Patent
Fraser et al.

(10) Patent No.: US 10,328,921 B2
(45) Date of Patent: Jun. 25, 2019

(54) BRAKE FADE AND BRAKE CAPACITY GAUGE

(71) Applicant: Ford Global Technologies, LLC, Dearborn, MI (US)

(72) Inventors: John G. Fraser, Joachim (CA); Andrew Denis Lewandowski, Sterling Heights, MI (US); Jason Christopher Matthews, Farmington Hills, MI (US); Lawrence Robert Rhein, China, MI (US); Jeremy Mateyk, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 15/005,608

(22) Filed: Jan. 25, 2016

(65) Prior Publication Data

US 2017/0210371 A1    Jul. 27, 2017

(51) Int. Cl.
| | | |
|---|---|---|
| *B60T 7/20* | (2006.01) | |
| *B60T 7/22* | (2006.01) | |
| *B60K 37/02* | (2006.01) | |
| *B60T 17/22* | (2006.01) | |
| *F16D 66/00* | (2006.01) | |

(52) U.S. Cl.
CPC .............. *B60T 17/22* (2013.01); *B60K 37/02* (2013.01); *B60T 7/20* (2013.01); *B60T 7/22* (2013.01); *F16D 66/00* (2013.01); *B60K 2350/1064* (2013.01); *B60K 2350/1072* (2013.01); *B60K 2350/1076* (2013.01); *B60T 2201/022* (2013.01); *B60T 2210/00* (2013.01); *B60T 2210/20* (2013.01); *B60T 2250/00* (2013.01); *B60T 2250/02* (2013.01); *B60T 2250/04* (2013.01); *F16D 2066/001* (2013.01)

(58) Field of Classification Search
CPC ................................ B60K 37/02; F16D 66/00
USPC ............................................................ 701/34.4
See application file for complete search history.

(56) References Cited

U.S. PATENT DOCUMENTS

| | | | |
|---|---|---|---|
| 2004/0036592 A1* | 2/2004 | Vertenten | B60T 17/221 340/453 |
| 2005/0212357 A1 | 9/2005 | Adams | |
| 2008/0236269 A1 | 10/2008 | Howell et al. | |
| 2012/0215412 A1 | 8/2012 | Seymour et al. | |
| 2013/0328675 A1 | 12/2013 | Roach | |

FOREIGN PATENT DOCUMENTS

| | | |
|---|---|---|
| CN | 2782496 Y | 5/2006 |
| CN | 104787023 A | 7/2015 |
| DE | 10 2008 020006 A | 10/2008 |
| JP | 1191550 A | 5/2001 |
| JP | 2001122107 A | 5/2001 |
| WO | 84-00406 A1 | 2/1984 |

* cited by examiner

*Primary Examiner* — Maceeh Anwari
(74) *Attorney, Agent, or Firm* — Frank Lollo; Brooks Kushman P.C.

(57) ABSTRACT

A controller can display via an instrument cluster a brake capacity based on a temperature of friction material of at least one brake of a vehicle and a predicted brake fade threshold that is derived from a speed, mass, and current angle of inclination of the vehicle.

11 Claims, 7 Drawing Sheets

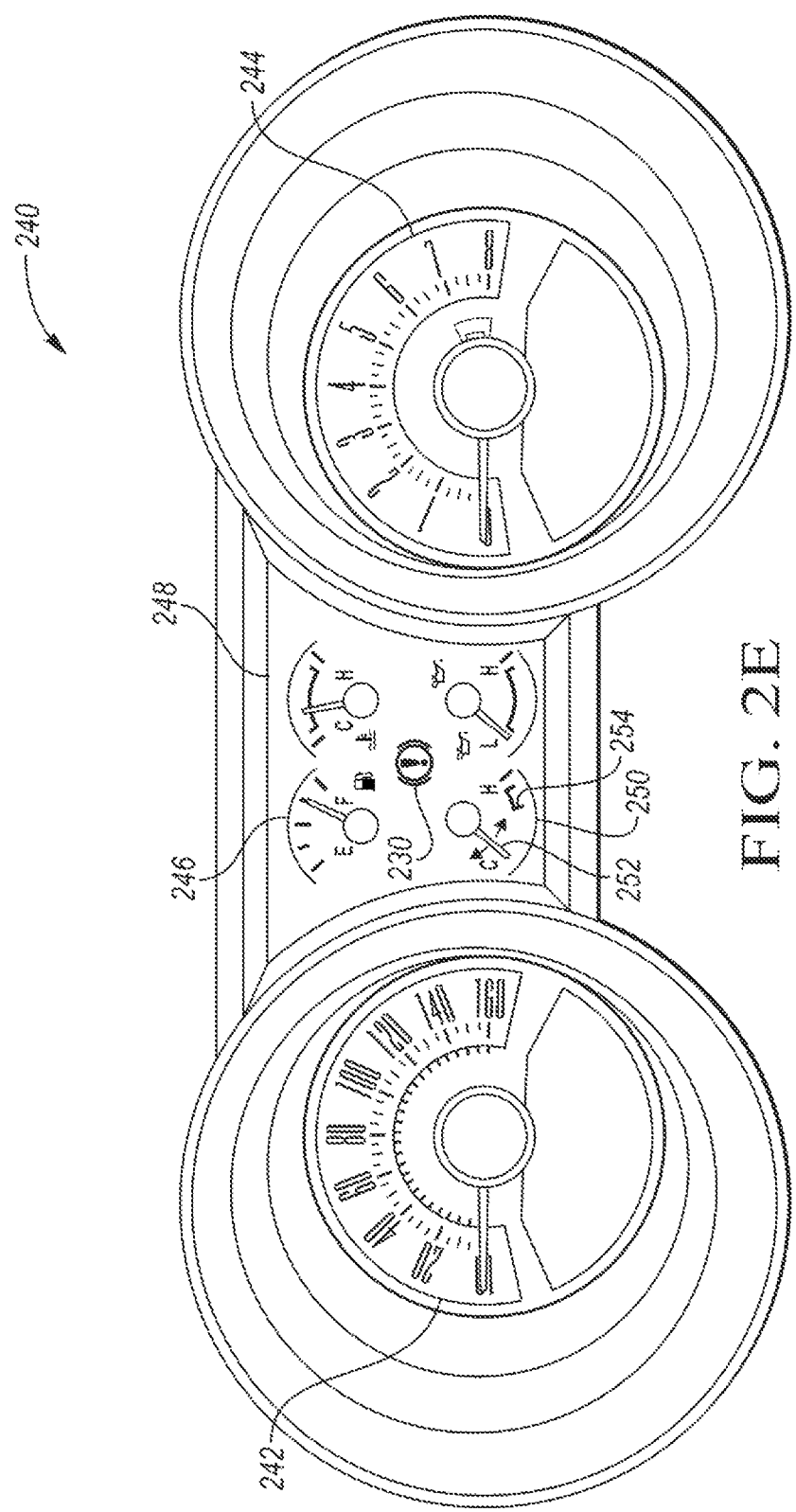

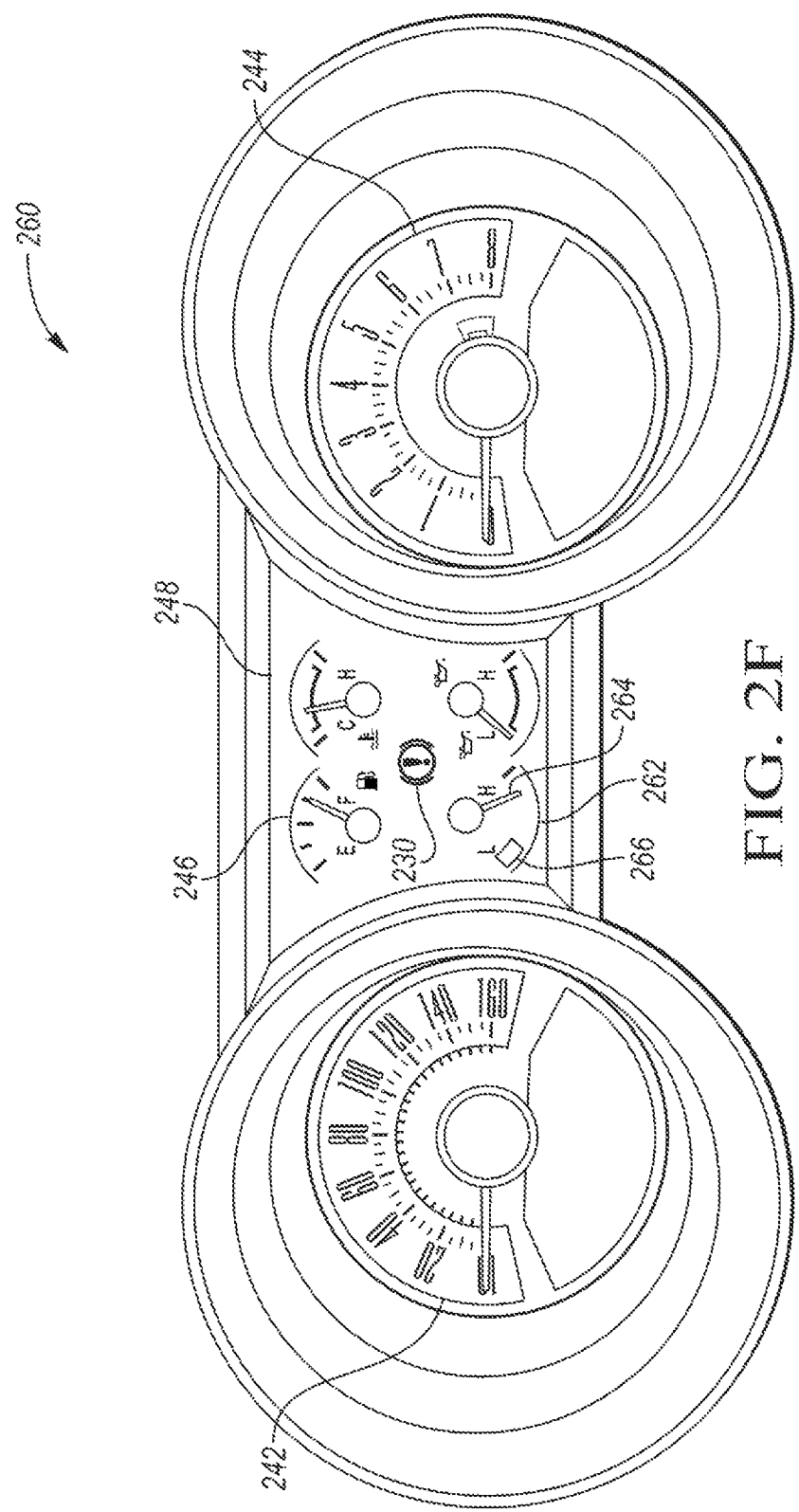

BRAKE FADE AND BRAKE CAPACITY GAUGE

TECHNICAL FIELD

Aspects of the disclosure generally relate to methods and apparatus of displaying in a vehicle an available brake capacity based on a predicted brake fade.

BACKGROUND

Many vehicles are equipped with automatic braking systems that use friction between a rotor and a brake lining, where the brake lining is on a brake pad, or friction between a drum and a brake lining, where the brake lining is on a brake shoe. One characteristic of friction brakes is a fading of a vehicle braking system performance, or brake fade. Brake fade is a reduction in stopping power that may occur after repeated or sustained application of a friction brake. Brake fade is caused by a buildup of heat in the friction material of the brakes including the brake lining, brake rotor, brake drum, or brake fluid. A loss of stopping power, or fade, may be caused by friction fade or fluid fade. Brake fade often occurs during travel down a long, steep decline. Disc brakes are more resistant to brake fade because heat can be vented away from the rotor and pads, while drums tend to hold in the heat.

Also, many vehicles are equipped with an adaptive cruise control (ACC) system. The ACC, working with conventional engine based speed control, may automatically apply vehicle friction brakes to maintain a constant speed or following distance. The ACC of a vehicle traveling down a hill or following a different vehicle may actively decelerate the vehicle by reducing the power output of the engine, or applying the vehicle brakes to maintain a speed of the vehicle or a distance between the vehicle and the different vehicle. A continual application of a friction brake, for example, during a downhill following mode may overwork the friction brakes and lead to brake fade. In order to avoid brake fade, some ACC systems are designed to disengage when the friction brakes exceed a temperature.

Furthermore, many modern vehicles are equipped with electronic gauge clusters to present vehicle operating parameters for a driver to use to access the operational condition of the vehicle. A digital dash is an electronic gauge cluster including a set of vehicle gauges that may be displayed with a configurable digital readout or display panel, rather than with traditional analog gauges.

SUMMARY

An information console for a vehicle includes a gauge configured to display a capacity of vehicle brakes, and a controller configured to output the capacity to the display based on a temperature signal indicative of a temperature of friction material of the vehicle brakes and a predicted brake fade threshold derived from a speed, mass, and current angle of inclination of the vehicle.

A vehicle includes at least one brake, an instrument cluster, and a controller configured to display via the cluster a brake capacity based on a temperature of friction material of the at least one brake and a predicted brake fade threshold derived from a speed, mass, and current angle of inclination of the vehicle.

A computer-implemented method includes outputting by a controller a capacity of vehicle brakes to a display based on a temperature associated with a friction material of the vehicle brakes and a predicted brake fade threshold derived from a speed, mass, and current angle of inclination of the vehicle.

BRIEF DESCRIPTION OF THE DRAWINGS

FIG. 2E illustrates an example vehicle information console including a gauge of brake temperature and predicted brake fade threshold disposed within a dashboard of a vehicle.

FIG. 2F illustrates an exemplary vehicle information console including a gauge of brake capacity disposed within a dashboard of a vehicle.

DETAILED DESCRIPTION

Figure 1:
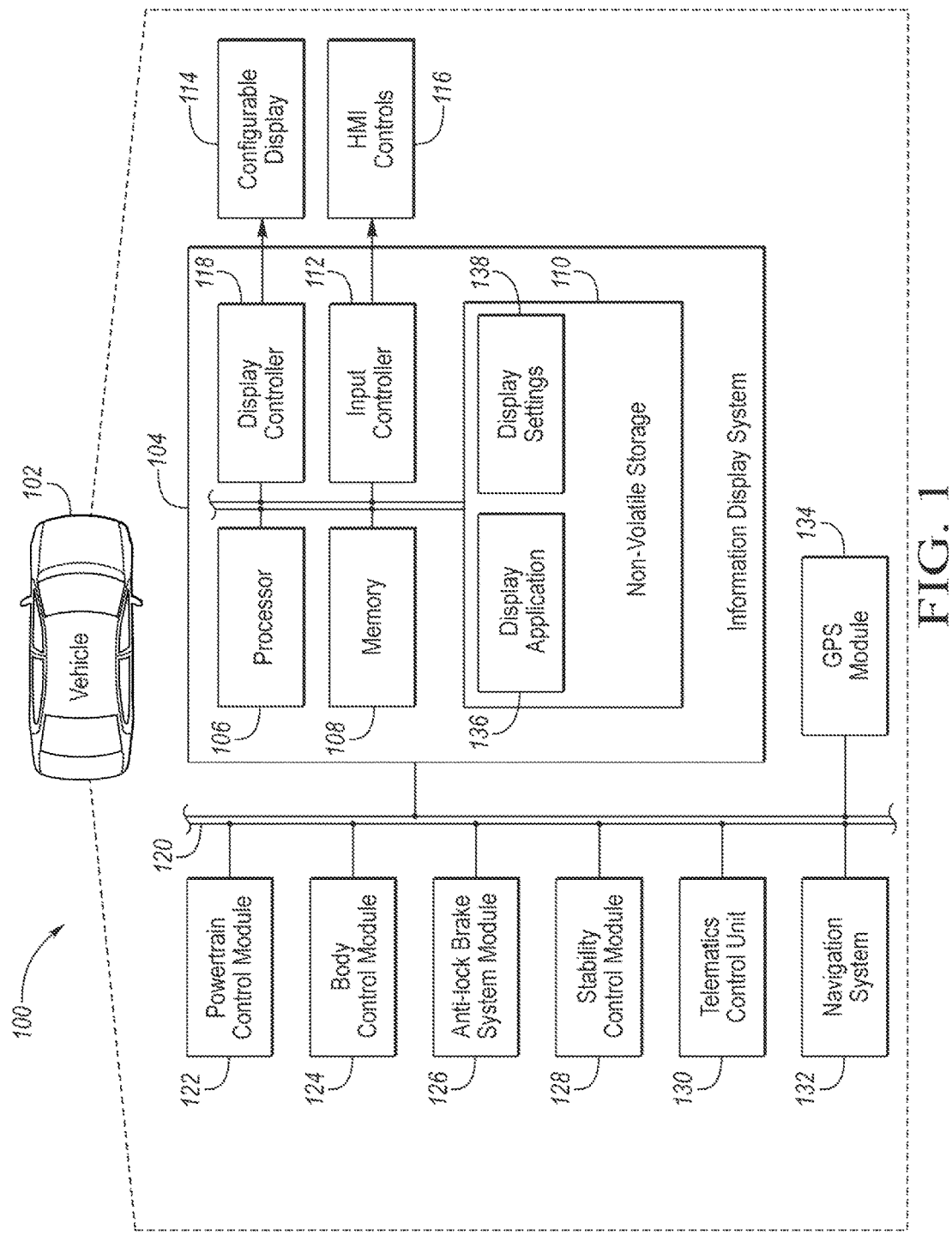
FIG. 1 illustrates an example of a vehicle including a configurable display to facilitate communication of information with a driver.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern instrument clusters may include a display area capable of being switched to show one of dozens of available vehicle operation characteristic. The vehicle operation characteristics include a vehicle speed, an engine operating speed, a status of a quantity of fuel, a current engine coolant temperature, a vehicle battery voltage level, and an engine oil pressure. Here, another vehicle operation characteristic, a brake capacity is proposed. One embodiment of the brake capacity includes a bar gauge of the brake capacity in which the magnitude of the indicator of the bar gauge is based on a difference between a temperature of brake material and a temperature threshold at which brake fade occurs offset by a predicted rise in temperature of brake material. The predicted rise in brake material may be a static determination based on vehicle speed, vehicle weight, and an inclination of the vehicle. A more comprehensive determination of the predicted rise in brake material may include a change in elevation, a predicted duration that the brakes will be applied, a route from a navigation system indicating a future desired speed and a change in elevation along the route. Based on the brake capacity, a driver may be able to take an informed course of action before a critical situation occurs. For example, if a driver of a vehicle traveling on a steep downhill mountain highway is informed of a potential brake fade situation along a planned route, the driver may choose to exit the highway to stop the vehicle and allow the brake material to cool. Another embodiment may include a needle that articulates in response to a temperature of brake material and a temperature threshold at which brake fade occurs. Also, an embodiment may include a friction coefficient of brake material or a profile of a friction coefficient of brake material with respect to temperature. The friction coefficient of brake material or profile of the friction coefficient of brake material may be monitored and updated based on historical brake force applied and a resultant brake force. The brake force applied may be based on a brake pedal position or a brake fluid pressure. The resultant brake force may be based many factors including a speed profile of the vehicle, an angle of inclination of the vehicle, a change in elevation of the vehicle, or a weight of the vehicle.

A driver of a vehicle may desire to monitor brake capacity during many vehicle operating conditions including traversing a steep decline, towing a trailer, or operating a performance vehicle. A vehicle instrument cluster may include a display such as a Vacuum Florescence Display (VFD), a Liquid Crystal Display (LCD), a Light Emitting Diode (LED) display, a Heads Up Display (HUD), or other technology used to produce a graphical image for the vehicle operator. Alternatively, a mechanical gauge may be used to indicate a brake capacity including a needle configured to rotate with respect to a face plate. The needle may be driven by a motor such as a stepper motor, or a pressure such as a fluid pressure. Often the display is configured to allow a user to modify the graphical user interface thus selecting which vehicle characteristic is displayed to the operator. For example, brake capacity may be desired to be monitored while traversing a steep decline, towing a trailer, or operating a performance vehicle on a closed course such as racing, while brake capacity may not be desired while traveling at slow speeds with little or no inclination or predicted change in elevation.

FIG. 1 illustrates an example 100 of a vehicle 102 including a configurable display 114 to facilitate communication of information with a driver. The vehicle 102 may include various types of passenger vehicle, such as crossover utility vehicle (CUV), sport utility vehicle (SUV), truck, recreational vehicle (RV), boat, plane or other mobile machine for transporting people or goods. It should be noted that the illustrated vehicle 102 is merely an example, and more, fewer, and/or differently located elements may be used.

An information display system 104 of the vehicle 102 may include one or more processors 106 configured to perform instructions, commands and other routines in support of the processes described herein. For instance, the information display system 104 may be configured to execute instructions of a display application 136 based on display settings 138 loaded to a memory 108 to provide information display features such as trip counters, fuel economy, fuel history, digital speedometer, engine information, or a brake capacity. Such instructions and other data may be maintained in a non-volatile manner using a variety of types of computer-readable storage medium 110. The computer-readable medium 110 (also referred to as a processor-readable medium or storage) includes any non-transitory medium (e.g., a tangible medium) that participates in providing instructions or other data that may be read by the processor 106 of the information display system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The information display system 104 may be provided with various features allowing the vehicle occupants to interface with the information display system 104. For example, the information display system 104 may include an input controller 112 configured to receive user input from one or more human-machine interface (HMI) controls 116 of the vehicle 102 providing for occupant-vehicle interaction. These may include one or more buttons, knobs, or other controls configured to invoke functions on the information display system 104. The information display system 104 may also drive or otherwise communicate with one or more configurable displays 114 configured to provide visual output to vehicle occupants by way of a display controller 118.

The configurable display 114 may be disposed within a dashboard of the vehicle such as within the instrument panel cluster. In other examples, the configurable display 114 may be part of another display system, such as the navigation system, or may be part of a dedicated information display system elsewhere in the vehicle 102. The configurable display 114 may be a liquid crystal display (LCD), a plasma display, an organic light emitting display (OLED), or any other suitable display. In some cases, the configurable display 114 may be a touch screen further configured to receive user touch input via the display controller 118, while in other cases the configurable display 114 may be a display only, without touch input capabilities, such as when included within the instrument cluster behind the steering wheel.

The information display system 104 may be further configured to communicate with other components of the vehicle 102 via one or more in-vehicle buses 120. The in-vehicle buses 120 may include one or more of a vehicle controller area network (CAN), an Ethernet network, and a media oriented system transfer (MOST), as some non-limiting possibilities. The in-vehicle buses 120 may allow the information display system 104 to communicate with other systems within the vehicle 102. The exemplary vehicle systems described in detail below may communicate with the information display system 104 over an in-vehicle bus 120. In other examples, the information display system 104 may be connected to more or fewer in-vehicle buses 120, and one or more HMI controls 116 or other components may be connected to the information display system 104 via in-vehicle buses 120 or directly without connection to an in-vehicle bus 120.

In an example, a powertrain control module 122 may be a component in communication with the information display system 104, and may be configured to provide information to the information display system 104 regarding control of engine operating components (e.g., idle control, fuel delivery, emissions control, engine diagnostic codes, engine RPM, etc.). A body control module 124 may be configured to manage various power control functions such as exterior lighting, interior lighting, keyless entry, remote start, connection of trailer lights, depression of a brake pedal, and provide information to the information display system 104 such as point of access status information (e.g., closure status of the hood, doors and/or trunk of the vehicle 102). An anti-lock brake module 126 may be configured to provide control and monitoring of brake system components, as well as to provide information to the information display system 104 regarding the components (e.g., master cylinder pressure, brake fluid level, brake force applied, brake fluid temperature, etc.). A stability control module 128 may be configured to perform functions such as active suspension control, traction control, and brake control, and provide sensed vehicle dynamics information to the information display system 104, such as roll angle, pitch angle, yaw rate, roll rate, pitch rate, lateral and longitudinal velocity, lateral and longitudinal acceleration, tire slip, tire slip rate, and an infotainment system module. A telematics control module 130 may include an in-vehicle modem configured to access communications services of a communications network (not shown), and may provide packet-switched network services (e.g., Internet access, voice over Internet protocol (VoIP) communication services) to the information display system 104 and to other devices connected over the in-vehicle bus 120. The telematics control module 130 may be configured to communicate with a remote device or portable device such as a mobile phone, tablet, watch, personal portable device, remote server, or other electronic system. The communication may be used to transfer information to the processor or controller. The information may be data indicative of a planned route, a planned change in elevation, or an updated friction coefficient for brake material. A navigation system 132 may be configured to, upon entering a destination, route a path from a current location to the destination. Based on the path, the navigation system 132 may perform routing and display functions such as displaying the path, tracking vehicle movement, tracking changes in a speed of the vehicle, and tracking changes in an elevation of the vehicle, along with predicting changes in a future speed of the vehicle, and predicting changes in a future elevation of the vehicle based on the path. The current location may be determined by a global positioning system (GPS) module 134. The GPS module 132 may be in communication with remote satellites enabling the GPS module to predict changes in a future speed of the vehicle 102, and predict changes in a future elevation of the vehicle 102 based on a current vehicle location, a vehicle heading and map data indicative of a current road the vehicle is traveling on.

A display application 136 may be installed to the information display system 104 and utilized to allow the vehicle 102 to provide output to the display controller 118, such that the configurable display 114 conveys the information relating to the operation of the vehicle 102 to the driver. In an example, the display application 136 may be configured to provide a menu structure via the configurable display 114 having set of categories into which information screens are placed, such as performance, truck, towing, mountain passes, and off-road. The menu structure may further include information screens that may be selected from the categories. For instance, the performance category may include a lap counter screen for a time split between consecutive laps along a closed course, a g-force screen for lateral acceleration, and a brake capacity screen. As more examples, the truck information category may include a gauge selection screen, a tire pressure screen, a digital speedometer screen, an engine information screen, and a brake capacity screen. As some further examples, the towing category may include a towing status screen, a towing information screen, a trailer light status screen, a trailer setup screen, a connection checklist screen, and a brake capacity, and the off-road category may include an off-road status screen, a vehicle inclination screen, a power distributions screen, and a brake capacity screen. When a screen is selected from the menu structure (e.g., via user input to the HMI controls 116), the selected screen may be provided on the configurable display 114. Also, a display may be used in conjunction with mechanical needles such as having shafts of gauges at a peripheral of the display whereas the needles are configured to extend over the display. The display may then be configured as a faceplate to the gauges. Here, the display may change to match the desired vehicle characteristic displayed by the gauge/display combination.

Figure 2A:
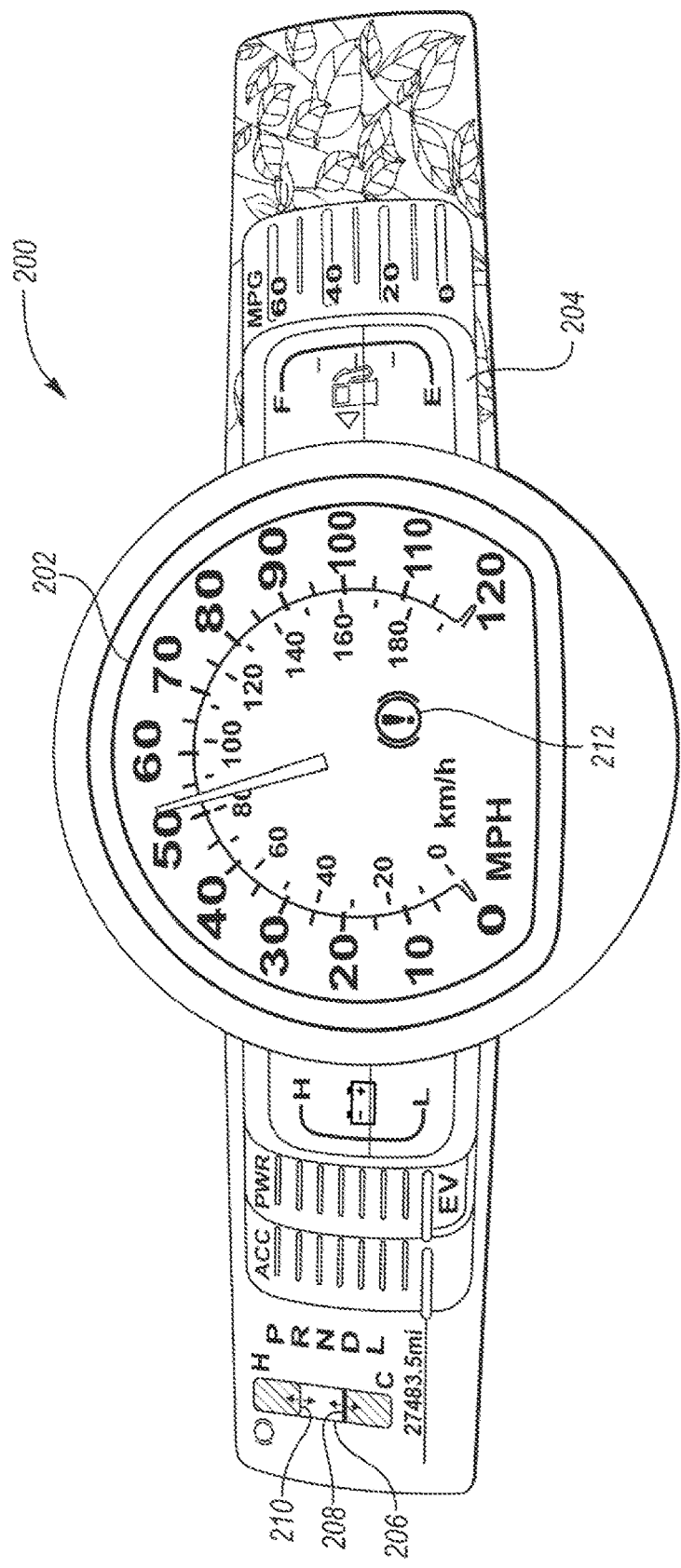
FIG. 2A illustrates an example vehicle information console including a bar graph of brake temperature and predicted brake fade threshold disposed within a dashboard of a vehicle.

FIG. 2A illustrates an exemplary vehicle information console 200 including a speedometer 202, a fuel gauge 204, a bar graph 206 of a brake temperature indicator 208 and a predicted brake fade threshold 210, and a brake warning indicator 212 configured to be disposed within a dashboard of the vehicle. Here, the bar graph 206 illustrates the brake temperature indicator 208, in which the indicator rises or falls indicative of an increase or decrease in a temperature of brake material. The increase or decrease of the brake temperature indicator 208 may be based on a signal from a thermocouple configured to measure a temperature of the brake material, it may be based on detection of light such as infrared light indicative of a temperature of the brake material, or it may be based on a brake model. The brake model may be based on many factors including ambient temperature, brake fluid pressure, brake force, brake duration, rotor design, brake material, friction coefficient, angle of inclination, and vehicle weight. The vehicle weight may be entered by the driver, or determined by a suspension system of the vehicle or a powertrain control module (PCM), an engine control module (ECM), or a transmission control module (TCM). Also, the vehicle weight may include a weight of a trailer coupled with the vehicle. The presence of a trail may be determined by a tow/haul button or the detection of a trailer lights. Along with the presence of a trailer is the determination of trailer brakes, in which the brake model may compensate for the use of trailer brakes.

The thermocouple sensor may provide a temperature of all four brakes or some combination of brakes (e.g., one front and one rear brake or two front brakes). A brake temperature signal from the thermocouple may be an average of all thermocouple inputs or a highest reported temperature. The signal may be sent on a vehicle bus such as the CAN bus. The gauge may display a filtered signal to avoid excessive gauge needle movement.

The model may also be able to compensate for a stuck or sticky brake caliper. Here, the available brake capacity is the distance between the brake temperature indicator 208 and the predicted brake fade threshold 210. Also, the predicted brake fade threshold 210 may increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. If the brake capacity drops below a lower threshold, a brake warning indicator 212 may be activated. In another embodiment, if the brake capacity drops below a lower threshold, the brake temperature indicator 208 or the bar gauge 206 may flash to alert the driver.

The brake warning indicator 212 may also produce messages in which the messages correspond to a vehicle type or an operation mode. For example, a truck or passenger vehicle may output a message "Select a Lower Gear to Avoid Brake Fade". A sports car or operation in a performance mode may output a message "Optimal Brake Temperature Reached". A hybrid vehicle, an electric vehicle, or a vehicle with a manual transmission may output a message "Shift to Low to Avoid Brake Fade" or "Downshift to Avoid Brake Fade". A secondary threshold may also be used and a message upon reaching the secondary threshold may include "Brake Fade Imminent—Stop Safely Now".

Figure 2B:
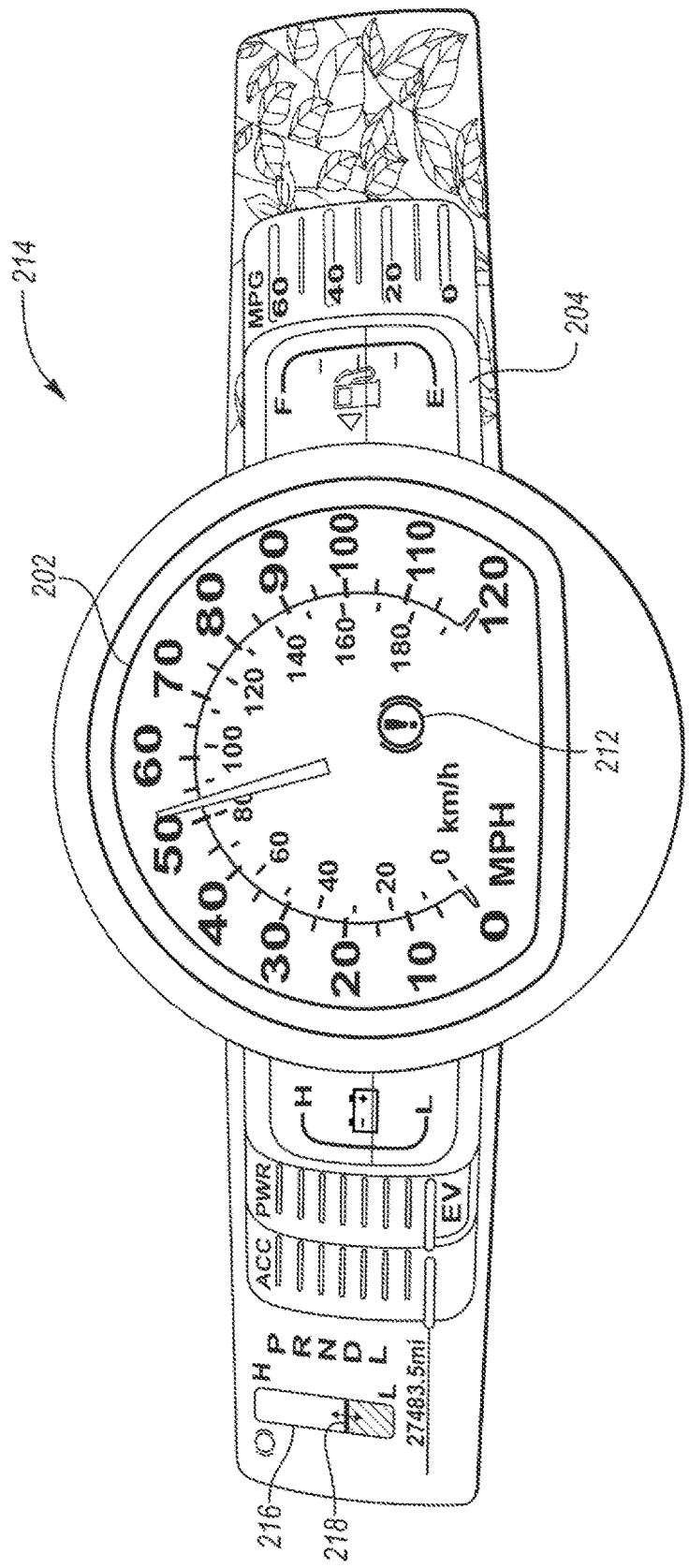
FIG. 2B illustrates an example vehicle information console including a bar graph of brake capacity disposed within a dashboard of a vehicle.

FIG. 2B illustrates an exemplary vehicle information console 214 including the speedometer 202, fuel gauge 204, a bar graph 216 of a brake capacity 218, and a brake warning indicator 212 disposed within a dashboard of the vehicle. Here, the bar graph 216 illustrates the brake capacity indicator 218, in which the indicator rises or falls indicative of an increase or decrease in a brake capacity being a difference in a temperature of brake material and a predicted brake fade threshold. The temperature of the brake material may be based on a signal from a thermocouple configured to measure the temperature of the brake material, it may be based on detection of light such as infrared light indicative of the temperature of the brake material, or it may be based on a brake model based on usage including brake force, brake duration, rotor design, brake material, friction coefficient, angle of inclination, and vehicle weight. The model may also be able to compensate for a stuck or sticky brake caliper. The predicted brake fade threshold 210 may increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. Here, when the difference between the predicted brake fade threshold and the temperature of the brake material is large, the brake capacity indicator 218 will increase. As the temperature of the brake material increases or the predicted brake fade threshold decreases, the brake capacity indicator 218 will decrease. The predicted brake fade threshold may decrease as a speed of the vehicle increases, as the weight of the vehicle increases, as angle of inclination decreases (i.e., traversing down a hill or grade), or as a predicted route is indicative of application of brakes for a duration increases. If the brake capacity drops below a lower threshold, a brake warning indicator 212 may be activated.

Figure 2C:
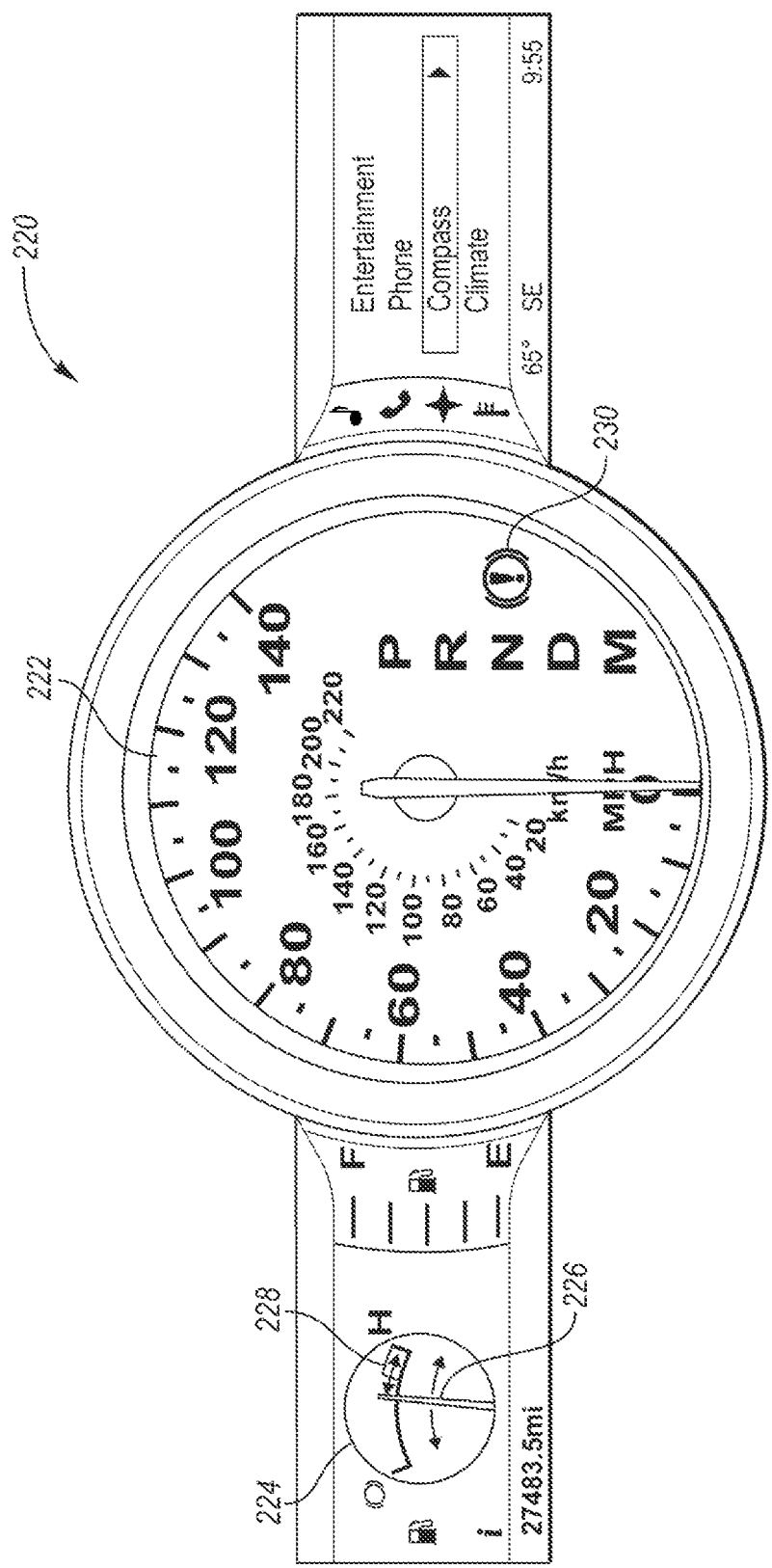
FIG. 2C illustrates an example vehicle information console including a gauge of brake temperature and predicted brake fade threshold disposed within a dashboard of a vehicle.

FIG. 2C illustrates an exemplary vehicle information console 220 including a speedometer 222, a brake temperature gauge 228 including a brake temperature indicator 226 and a predicted brake fade threshold 228, and a brake warning indicator 230 disposed within a dashboard of the vehicle. Here, the brake temperature indicator 226 illustrates an increase or decrease in a temperature of brake material by movement to the right or to the left. The increase or decrease of the brake temperature indicator 226 may be based on a signal from a thermocouple configured to measure a temperature of the brake material, it may be based on detection of light such as infrared light indicative of a temperature of the brake material, or it may be based on a brake model based on usage including brake force, brake duration, rotor design, brake material, friction coefficient, angle of inclination, and vehicle weight. The model may also be able to compensate for a stuck or sticky brake caliper. Here, the available brake capacity is the distance between the brake temperature indicator 226 and the predicted brake fade threshold 228. In one embodiment, the brake fade threshold is stationary and calibrated based on predetermined vehicle characteristics. However in other embodiments, the predicted brake fade threshold 228 may be displayed to increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. The display of the predicted brake fade threshold 228 may be via a virtual gauge on a display or a physical needle articulated over a display. If the brake capacity drops below a lower threshold, a brake warning indicator 230 may be activated.

Figure 2D:
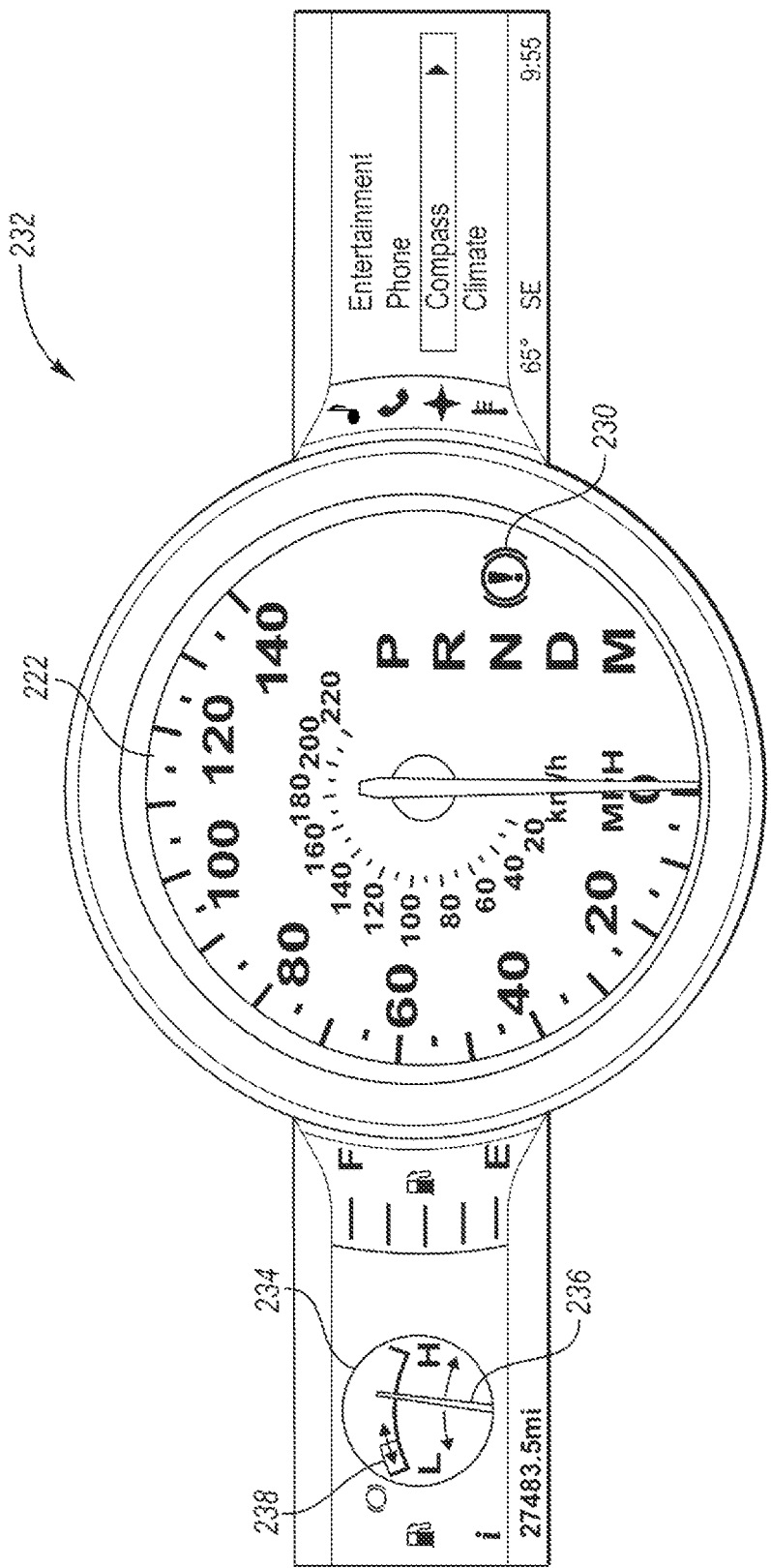
FIG. 2D illustrates an example vehicle information console including a gauge of brake capacity disposed within a dashboard of a vehicle.

FIG. 2D illustrates an exemplary vehicle information console 232 including the speedometer 222, a brake capacity gauge 234 including a brake capacity indicator 236 and a low capacity threshold 238, and the brake warning indicator 230 disposed within a dashboard of the vehicle. Here, the gauge 234 and brake capacity indicator 236 illustrate an increase or decrease in a brake capacity by movement to the right or to the left. An increase or decrease in a brake capacity may be a difference in a temperature of brake material and a predicted brake fade threshold. The temperature of the brake material may be based on a signal from a thermocouple configured to measure the temperature of the brake material, it may be based on detection of light such as infrared light indicative of the temperature of the brake material, or it may be based on a brake model based on usage including brake force, brake duration, rotor design, brake material, friction coefficient, angle of inclination, and vehicle weight. The model may also be able to compensate for a stuck or sticky brake caliper. The predicted brake fade threshold may increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. Here, when the difference between the predicted brake fade threshold and the temperature of the brake material is large, the brake capacity indicator 236 will move to the right indicative of a high amount of brake capacity available. As the temperature of the brake material increases or the predicted brake fade threshold decreases, the brake capacity indicator 236 will decrease. The predicted brake fade threshold may decrease as a speed of the vehicle increases, as the weight of the vehicle increases, as an angle of inclination decreases (i.e., traversing down a hill or grade), or as a predicted route is indicative of application of brakes for a duration increases. If the brake capacity drops below a lower threshold, a brake warning indicator 230 may be activated.

FIG. 2E illustrates an example vehicle information console 240 including a speedometer 242, a tachometer 244, a fuel gauge 246, an engine temperature gauge 248, a gauge 250 including a brake temperature indicator 252 and a predicted brake fade threshold 254, and a brake warning indicator 230 disposed within a dashboard of the vehicle. Here, the brake temperature indicator 252 illustrates an increase or decrease in a temperature of brake material by movement to the right or to the left. The increase or decrease of the brake temperature indicator 252 may be based on a signal from a thermocouple configured to measure a temperature of the brake material, it may be based on detection of light such as infrared light indicative of a temperature of the brake material, or it may be based on a brake model based on usage including brake force, brake duration, rotor design, brake material, friction coefficient, angle of inclination, and vehicle weight. The model may also be able to compensate for a stuck or sticky brake caliper. Here, the available brake capacity is the distance between the brake temperature indicator 252 and the predicted brake fade threshold 254. In one embodiment, the brake fade threshold is stationary and calibrated based on predetermined vehicle characteristics. However in other embodiments, the predicted brake fade threshold 254 may be displayed to increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. The display of the predicted brake fade threshold 254 may be via a virtual gauge on a display or a physical needle articulated over a display. If the brake capacity drops below a lower threshold, a brake warning indicator 230 may be activated.

FIG. 2F illustrates an exemplary vehicle information console 260 including a speedometer 242, a tachometer 244, a fuel gauge 246, an engine temperature gauge 248, a gauge 262 including a brake capacity indicator 264 and a predicted low threshold 266, and a brake warning indicator 230 disposed within a dashboard of the vehicle. Here, the gauge 262 and brake capacity indicator 264 illustrate an increase or decrease in a brake capacity by movement to the right or to the left. An increase or decrease in a brake capacity may be a difference in a temperature of brake material and a predicted brake fade threshold. The temperature of the brake material may be based on a signal from a thermocouple configured to measure the temperature of the brake material, it may be based on detection of light such as infrared light indicative of the temperature of the brake material, or it may be based on a brake model based on usage including brake force, brake duration, rotor design, brake material, friction coefficient, angle of inclination, and vehicle weight. The model may also be able to compensate for a stuck or sticky brake caliper. The predicted brake fade threshold may increase or decrease based on factors including a speed of the vehicle, an angle of inclination, a predicted route of travel, or a predicted change in elevation. The predicted route of travel may include locations in which a vehicle is expected to apply brakes such as at a stop sign, a traffic light, a location having historical slower speed, or a location associated with real-time traffic congestion. Here, when the difference between the predicted brake fade threshold and the temperature of the brake material is large, the brake capacity indicator 264 will move to the right indicative of a high amount of brake capacity available. As the temperature of the brake material increases or an ambient temperature increases, a predicted brake fade threshold decreases, and the brake capacity indicator 264 will decrease. The predicted brake fade threshold may decrease as a speed of the vehicle increases, as the weight of the vehicle increases, as angle of inclination decreases (i.e., traversing down a hill or grade), or as a predicted route is indicative of application of brakes for a duration increases. If the brake capacity drops below a lower threshold, a brake warning indicator 230 may be activated.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An information console for a vehicle comprising:
a gauge configured to display a capacity of vehicle brakes; and
a controller configured to output the capacity to the display based on a temperature signal indicative of a temperature of friction material of the vehicle brakes and a predicted brake fade threshold derived from a speed, mass, and current angle of inclination of the vehicle, and a brake material coefficient characterized by historical changes in brake temperature associated with a brake force and brake duration.

2. The vehicle of claim 1, wherein the predicted brake fade threshold is further derived from an expected change in elevation along a predetermined route.

3. The vehicle of claim 1, wherein the predicted brake fade threshold is further derived from an expected brake force required along a predetermined route.

4. The vehicle of claim 1, wherein the predicted brake fade threshold is further derived from an expected change in elevation associated with a current location and a direction of travel.

5. The vehicle of claim 1, wherein the temperature signal is an output from a thermocouple or a result of a brake model.

6. The vehicle of claim 1, wherein the controller is further configured to output a warning if the capacity is less than a threshold or the temperature exceeds the predicted brake fade threshold.

7. The vehicle of claim 1, wherein the capacity is based on a difference between the predicted brake fade threshold and the temperature.

8. A computer-implemented method comprising:
outputting by a controller a capacity of vehicle brakes to a display based on a temperature associated with a friction material of the vehicle brakes and a predicted brake fade threshold derived from a speed, mass, and current angle of inclination of the vehicle, and a brake material coefficient characterized by historical changes in brake temperature associated with a brake force and brake duration.

9. The method of claim 8, wherein the capacity is based on a difference between the temperature and predicted brake fade threshold.

10. The method of claim 8, wherein the predicted brake fade threshold is further derived from an expected change in elevation associated with a current location and a direction of travel.

11. The method of claim 8, wherein the predicted brake fade threshold is further derived from an expected brake force required along a predetermined route.

\* \* \* \* \*